United States Patent [19]
Ju et al.

[11] Patent Number: 5,937,195
[45] Date of Patent: *Aug. 10, 1999

[54] GLOBAL CONTROL FLOW TREATMENT OF PREDICATED CODE

[75] Inventors: Dz-ching Ju, Sunnyvale; David M. Gillies, Cupertino, both of Calif.

[73] Assignee: Hewlett-Packard Co, Palo Alto, Calif.

[*] Notice: This patent is subject to a terminal disclaimer.

[21] Appl. No.: 08/756,600

[22] Filed: Nov. 27, 1996

[51] Int. Cl.⁶ ........................................................ G06F 9/44
[52] U.S. Cl. .......................... 395/709; 395/704; 395/706; 395/705; 712/201; 712/216
[58] Field of Search .................................... 395/701, 703, 395/704, 705, 706, 709, 377; 712/201, 216

[56] References Cited

U.S. PATENT DOCUMENTS

| | | | |
|---|---|---|---|
| 4,782,444 | 11/1988 | Munshi et al. | 395/709 |
| 5,161,216 | 11/1992 | Reps et al. | 395/704 |
| 5,339,238 | 8/1994 | Benson | 395/707 |
| 5,448,737 | 9/1995 | Burke et al. | 395/709 |
| 5,659,754 | 8/1997 | Grove et al. | 395/709 |
| 5,768,595 | 6/1998 | Gillies | 395/709 |

OTHER PUBLICATIONS

Alexandre E. Eichenberger and Edward S. Davidson, "Register Allocation for Predicated Code," In Proc. of the 28th Annual International Symposium on Microarchitecture, Nov. 1995.

N.J. Walters, S.A. Mahlke, W.-M. W. Hwu and B.R. Rau, "Reverse IF–Conversion." In Proc. of the SIGPLAN '93 Conference on Programming Language Design and Implementation, pp. 290–299, Jun. 1993.

S.A. Mahlke, D.C. Lin, W.Y. Chen, R.E. Hank and R.A. Bringmann, "Effective Compiler Support for Predicated Execution Using Hyperblock," In Proc. of the 25th Annual International Symposium on Microarchitecture, pp. 45–54, Dec. 1992.

V. Kathail, M. Schlansker, B. Rau, "HPL PlayDoh Architecture Specification: Version 1.0," Hewlett–Packard Laboratories Technical Report, HPL–93–80, Feb. 1993.

Eichenberger et al., "Stage Scheduling: a Technique to Reduce the Register Requirements of a Modulo Schedule," In Proc. of the 28th Annual International Symposium on Microarchitecture, pp. 338–349, Nov. 1995.

Banerjee et al., "The Paradigm Compiler for Distributed–Memory Multicomputers," IEEE Comput. Soc., vol. 28, Issue 10, pp. 37–47, Oct. 1995.

Gupta et al., "A Unified Framework for Optimizing Communication in Data–Parallel Programs," IEEE Trans. on Parallel & Dist. Sys., vol. 7, No. 7, pp. 689–704, Jul. 1996.

*Primary Examiner*—James P. Trammell
*Assistant Examiner*—Tuan Q. Dam

[57] ABSTRACT

The relationships among predicates are tracked globally by uniformly treating both control flow and explicit predicates by mapping them to a single connected partition graph. This allows for the analysis of predicate relations based on the scope of an entire procedure. This predicate analysis can be invoked by various phases of compiler optimization without being constrained by an incremental update of any persistent data structures.

40 Claims, 3 Drawing Sheets

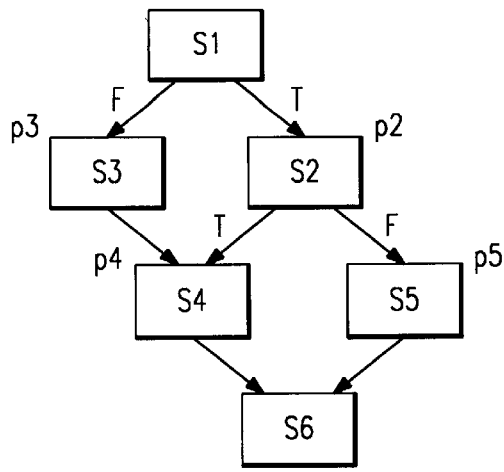
FIG. 1A
FIG. 1B
I1: p2, p3 = cmpp.un.uc (s1 cond)   if true
I2: p4 = cmpp.uc (s1 cond)          if true
I3: S2                              if p2
I4: p5 = cmpp.uc (s2 cond)          if p2
I5: p4 = cmpp.on (s2 cond)          if p2
I6: S3                              if p3
I7: S5                              if p5
I8: S4                              if p4
I9: S6                              if true
FIG. 2
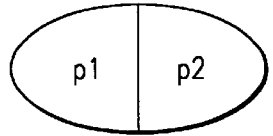
p3 = p1 U p2
FIG. 3A
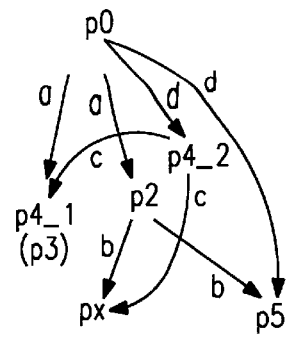

FIG. 5

```
                                                                501
for every compare instruction in CFG
    cinst = current compare instruction;
    qp = qualifying predicate of cinst;
    bp = control predicate assigned to the basic block containing cinst;
    p1 = the first destination predicate;
    p1_old = the old definition of p1 if p1 is an update reference;
    p2 = the second destination predicate if exists;
    pp = parent predicate;

if (qp == p0) pp = bp;
    else pp = qp;

switch (compare type)
    case .un.uc:
        Create a partition with pp as the parent predicate and
        p1 and p2 as child predicates;
    case .cn.cc:
        if (qp == p0) process in the same way as a .un.uc case;
        else map both p1 and p2 to a null predicate node;
    case .an (.ac):
        Create a partition with p1_old as the parent predicate and
        p1 and an implicit predicate as child predicates;
    case .on(.oc):
        Create a partition with p1 as the parent predicate and
        p1_old and an implicit predicate as child predicates;
        Create a partition with bp as the parent predicate and p1
        and an implicit predicate as child predicates;
                                                                502
```

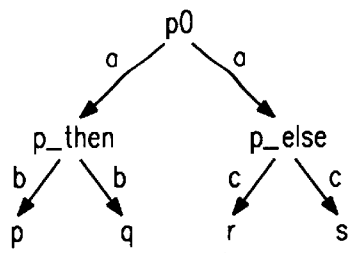

FIG. 6

GLOBAL CONTROL FLOW TREATMENT OF PREDICATED CODE

TECHNICAL FIELD OF THE INVENTION

This invention relates to the use of predicated code in high-performance microprocessors and more particularly to such use in a system and method for globally analyzing predicates to determine possible interferences.

BACKGROUND OF THE INVENTION

To fully utilize the wide machine resources in modern high-performance microprocessors, it is necessary to exploit parallelism beyond individual basic blocks. Architectural support for predicated execution increases the degree of instruction level parallelism by allowing instructions from different basic blocks to be converted to straight-line code guarded by boolean predicates. However, predicated execution also presents a significant challenge to an optimizing compiler.

As will be discussed, we will assume the architectural support of a general predicated execution model provided in the HPL Playdoh architecture as shown in V. Kathail, M. Schlansker, B. Rau, *HPL Playdoh Architecture Specification: Version 1.0*, Hewlett-Packard Laboratories Technical Report, HPL-93-80, February 1993, in which the execution of an instruction can be guarded by a qualifying predicate. The following form of compare instructions is provided to set predicates.

p1,p2=cmpp.<d1><d2>(a rel b) if qp

Predicates p1 and p2 are two destination predicates. Each of <d1> and <d2> is a two-letter descriptor that specifies a type and mode for the compare instruction. There are four comparison types: unconditional(u), conditional(c), parallel-or(o), and parallel-and(a), specified by the first letter of the descriptor. Each type has both a normal mode (n) and a complement mode (c), specified by the second letter of the descriptor. Descriptors <d1> and <d2> control destination predicates p1 and p2, respectively. The condition (a rel b) is in the form of a logical comparison of two variables a and b, where rel can be eq, ne, lt, etc. Predicate qp is the qualifying predicate.

To simplify the discussion for the unconditional and conditional types, we assume they are always generated in form of cmpp.un.uc and cmpp.cn.cc, respectively. Therefore, for a comparison with the unconditional type, the values of p1 and p2 are complementary. If the comparison type is and(or) and qp is true, the (on) target predicate (say p1) is equal to the result of (a rel b) "and"ed ("or"ed) with the old value of p1.

The following table is the summary on how the destination predicates are being set in these compare instructions. In the table, T and F stand for true and false values, respectively. X means "don't care" and nc means that the result is unchanged. We also assume that there is a special predicate register p0, where any read from it is always true and any write to it is discarded.

| qp | (a rel b) | un | uc | cn | cc | on | oc | an | ac |
|----|-----------|----|----|----|----|----|----|----|----|
| F  | X         | F  | F  | nc | nc | nc | nc | nc | nc |
| T  | T         | T  | F  | T  | F  | T  | nc | nc | F  |
| T  | F         | F  | T  | F  | T  | nc | T  | F  | nc |

The code fragment shown as (1) below shows the importance of recognizing predicate relations in a global scope. Both of x and y are defined and used in different basic blocks. To check for interferences, one would propagate the use of x under p to the else-clause towards the definition of x under r. While crossing the definition of y under s during this process, an interference will be assumed between x and y unless one can assert that p and s are disjoint. By examining the code, since p and s are defined in the then- and else- clauses, respectively, p and s can never be both true at the same time. However, it requires global analysis to systematically take control flow into account to assert the disjointness between p and s. This relation cannot be captured by a hyperblock or basic block based analysis. Further, with a global predicate analysis, one can also assert that p and r are disjoint. Therefore, the definition of x under r can never reach the use of x under p, and this definition is dead.

```
(1)
    p,q,r,s = false
    if ( .. ) then {
        p,q = cmpp.un.uc              if true
        x = ..                        if p
    } else {
        r,s = cmpp.un.uc (. . .)      if true
        x = ..                        if r
        y = ..                        if s
    }
    .. = x                            if p
    .. = y                            if s
```

Prior compilers used a predicate hierarchy graph (PHG) to track the boolean equations for all of the predicates in a hyperblock. This is shown in S. A. Mahlke, D. C. Lin, W. Y. Chen, R. E. Hank, and R. A. Bringmann, "Effective Compiler Support for Predicated Execution Using Hyperblock," In Proc. of the 25th Annual Int'l Symp. on Microarchitecture, pp. 45–54, December 1992. In the Mahlke, et al. work, predicate analysis occurs over the scope of a hyperblock and does not extend globally. When a companion data structure, like PHG, is maintained with the code, then it may require updating whenever the program is transformed.

There is proposed by N. J. Waters, S. A. Mahlke, W.-M. W. Hwu, and B. R. Rau, "Reverse If-conversion," In Proc. of the SIGPLAN'93 Conf. on Programming Language Design and Implementation, pp. 290–299, June 1993, a reverse if-conversion scheme to map predicates from the data flow domain back to the more familiar control flow domain. A major drawback of this approach is that during the remapping process some originally non-existent control paths may be created. This typically occurs when code is if-converted and then scheduled, thus permuted the order of the code. When this code is reverse if-converted, non-existent paths may cause conservative treatment in many analyses and transformations.

Alexandre E. Eichenberger and Edward S. Davidson, as discussed in their paper, "Register Allocation for Predicated Code," In Proc. of the 28th Annual Int'l Symp. on Microarchitecture, November 1995, solves a register allocation problem in the presence of predication by representing predicates as P-facts—logically invariant expressions. The mechanism concludes that two live ranges do not interfere if the intersection of the two sets of P-facts can be simplified to false using a symbolic package. This approach is also restricted to the scope of a hyperblock, and may have limited practicality given the potential exponential compilation time behavior with respect to the number of predicates.

A need therefore exists in the art for a predicated execution system to take into account the semantics of the predicates during compilation analyses, such as data flow analysis, without adding any artificial or unwanted steps in the process.

SUMMARY OF THE INVENTION

The foregoing problems and objections, as well as others are solved by one embodiment of our system and method which analysis describe techniques to the relations among predicates in order to improve the precision and effectiveness of various compiler analysis and transformation phases in the presence of predicated code. The predicate analysis system discussed herein operates globally to obtain relations among predicates based on the scope of an entire procedure. Moreover, the system and method combines control flow and predicates into a single unified framework which can be queried by subsequent optimization and analysis phases.

Application, Ser. No. 08/757,539, filed concurrently herewith, having a common assignee, entitled "SYSTEM AND METHOD FOR SOLVING GENERAL GLOBAL DATA FLOW PREDICATED CODE PROBLEMS" is hereby incorporated by reference herein.

The previous work in predicate analysis is generally based on the scope of a hyperblock, which is an if-converted single-entry multiple-exit control flow region. In this invention, each node in a control flow graph (CFG) is still a basic block, which is a single-entry single-exit region containing straight line sequence of predicated code. One advantage of this representation is that this is still the most familiar representation to compiler analyses and optimizations. We assume that a CFG has a single start node and a single stop node. Our global predicate analysis is based on the control flow and code stream in an entire procedure. Global predicate analysis provides more precise predicate relations when predicates are defined and used in different basic blocks.

We now extend previously defined notations to an entire procedure. A trace includes all of the executed instructions on an acyclic path from the start node to the end node in a CFG. A trace belongs to the domain of predicate p, if all of the instructions on this trace are executed when p is true. The key associating the predicates defined in different basic blocks is to analyze the reachability among these basic blocks. Analogous to predicates, we define the domain of a basic block to be all of the traces such that the basic block is executed. Therefore, when a basic block can be reached from another basic block (or vice versa), these two basic blocks are not disjoint. This reachability information is expressed in a global partition graph to track relations among basic blocks regardless of the existence of predicates.

In order to uniformly treat control flow and predication, we assign a predicate to each basic block. We call a predicate assigned to a basic block a control predicate and a predicate which explicitly appears in the instruction stream a materialized predicate whenever we need to distinguish them. A control predicate of a basic block is viewed as a predicate combining all of the conditions which control whether the basic block will be executed or not. We perform a global predicate analysis based on building a single complete predicate partition graph including both control predicates and materialized predicates. This single partition graph allows us to uniformly track the semantics of conditional execution through program branches as well as predicated execution. Note that our if-converter assures that if a control predicate is also materialized to a materialized predicate, they share the same domain and are mapped to the same node in the partition graph. This further improves the precision of the predicate analysis.

The graph construction mechanism described below can be invoked throughout the entire optimizer, without requiring update of persistent data structures. This can be done either before or after if-conversion. This flexibility is again due to that fact that we treat control flow and materialized predicates in a uniform way. Although if-conversion is the major source of creating materialized predicates, phases like expanding high level pseudo code may also emit predicated code. Data flow analyses both before and after if-conversion can be more precise for predicated code by knowing the global relations among materialized predicates.

One technical advantage of our invention is the development of global techniques to analyze the relations among predicates, and these relations can then be queried by a subsequent compilation analysis or transformation phase.

It is a further advantage of our invention to use the predicate analysis to integrate the relations among control flow and predication.

The system and method of this invention can advantageously run on many well known computers (none of which are shown). One example, would be the PA-RISC 8200, available from Hewlett-Packard Company.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1A shows an example control flow graph;

FIG. 1B shows an if-converted code;

FIG. 2 shows the set relations between predicate domains;

FIG. 3A shows a partition graph for the control flow of FIG. 1A;

FIG. 5 shows the construction of a partition graph for materialized predicates;

FIG. 6 shows an example partition graph.

DESCRIPTION OF THE PREFERRED EMBODIMENTS

Figure 3B:
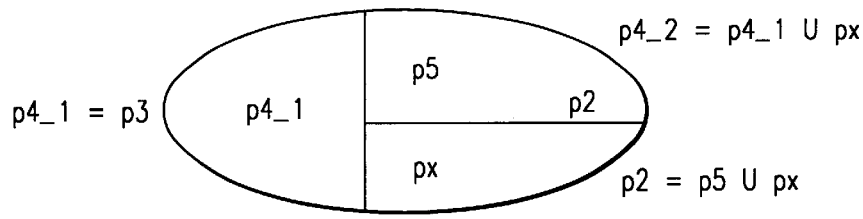
FIG. 3B shows the domains of the predicates for the graph of FIG. 1A.

FIGS. 1A AND 1B show an example which contain the original control flow graph and the if-converted code, respectively. If-conversion converts all six basic blocks into a single basic block with predicated code. Each of the switch points at the basic blocks containing S1 and S2 is converted to a compare instruction with an unconditional type. The merge (or confluence) point at the basic block containing S4 is converted to the combination of one compare instruction with an unconditional type and one compare instruction with an or type.

In our discussion, we will use the notion of predicate partition graph to track the relations among predicates. Such a system is disclosed in copending patent application of Richard Johnson and Michael Schlansker, entitled COMPILING A PREDICATED CODE WITH DIRECT ANALYSIS OF THE PREDICATED CODE, Ser. No. 08/756,423, filing date Nov. 26, 1996. To simplify the discussion, we assume that predicates are in static single assignment (SSA) form, where each predicate is statically defined no more than once.

However, this is not an actual requirement in our implementation. As shown in FIG. 1B, p4 is defined twice. To describe references to p4 in SSA form, the related definitions and uses are translated into the intermediate form, shown below in (3).

```
(3)
...
p4_1 = cmpp.uc ( ... )                              if true
...
p4_2 = p4_1 | px, where px = cmpp.un (s2 cond)      if p2
...
S4                                                  if p4_2
...
```

We use the concept of an execution set to describe the relations among predicates. We first define the following notations in a straight-line code and extend them to incorporate control flow later. An execution trace includes all of the instructions being executed from the beginning to the end in a straight-line code. A trace belongs to the domain (or basic execution set) of predicate p, if all of the instructions on this trace are executed when p is true. The domain of p includes all of such traces. Note that the concept of domain is only for an illustration purpose, and there is no need to enumerate these paths. If unambiguous, we may simply use p to mean the domain of p.

As shown in FIG. 2, partition of a predicate is a division of the domain of the predicate into multiple disjoint subsets, where the union of these subsets is equal to the domain. For example, the pictorial view of the relations among the predicates in instruction p1,p2=cmpp.un.uc ( ... ) if p3 is shown FIG. 2. When p3 is true, the values of p1 and p2 are always complementary. In other words, no acyclic execution path exists where p1 and p2 are both true. One can also derive that if p1 or p2 is true, p3 must be true.

In a predicate partition graph, G=(V,E), each node p in V represents predicate p and each edge (p,q) represents that there exists a partition in p such that q is a subset in this partition. An edge in G is directed and the edges created from the same partition are given the same label. G is a directed acyclic multigraph as there may be multiple edges between two given nodes due to different partitions. A partition graph is complete if the universal set, p0, is the unique root. This makes every node reachable from the root as is required by the algorithms used in predicate analysis. Because the partition graph approximates predicate relations, for the same code stream one may construct different partition graphs with various accuracies.

A partition graph for the if-converted code shown in FIG. 1B is shown in FIG. 3B. The pictorial view of the partitions shown FIG. 3B helps to understand how domains are partitioned. The root of the partition graph, p0, is partitioned into p2 and p3 in I1. In I4, p2 is partitioned into p5 and an implicit predicate px, which is created to complete this partition. Since instructions I1 and I2 both have an unconditional compare type and check for the same condition, these two instructions are essentially value congruent. Therefore, p3 and p4_1 always have the same value and can be mapped to the same predicate node. In I5, the union of px and p4-1 makes up the domain for p4_2. We can also find that the complement of p4_2 is p5 and generate another partition with p0 as the parent predicate and p4_2 and p5 as the child predicates. The step is necessary to make p4_2 reachable from the root. This is shown in FIG. 3A.

When a partition graph is constructed, one can build a global predicate query system based on the graph to support a number of different queries on predicated relations.

IsDisjoint (p.q.): asks whether the domain of predicate p overlaps with that of predicate q. Two predicates are disjoint if they can reach a common ancestor through different edges of the same partition. For example, in FIG. 3A, p3 and p5 are disjoint, but p2 and p4_2 are not. Note this is obvious from the domain relations in FIG. 3B, where px is a subset of both p2 and p4_2. It is straightforward to extend this query to IsDisjoint (p.Q.), where Q is a set of predicates, and the answer is true if p is disjoint from every predicate in Q.

IsSuperset (p,q): asks whether the domain of p is a superset of the domain of q. Predicate p is a superset of predicate q if there is an edge from p to q. For example, in FIG. 3A, p2 is a superset of p5.

IsComplement (p,q): asks whether the domains of p and q are complementary to each other. Predicates p and q are complementary to each other if the union of their domains is equal to that of an existing predicate and the intersection of their domains is empty.

LeastUpperBoundSum(p, Q): adds predicate p to a set of predicates, Q. The domain of the resultant set is the smallest superset of the union of the domain of p and the domain of Q. The resultant set is expected to be simplified in the way that if all of the child predicates in a partition appear in the union of p and Q, these child predicates are replaced with their parent predicate.

LeastUpperBoundDiff(p,Q: subtracts predicate p from a set of predicates, Q. The domain of the resultant set is the smallest superset of the domain of Q subtracted by the domain of p. For the example in FIG. 3A, px is equal to LeastUpperBoundDiff(p5,p2).

In order to analyze control flow, control predicates are assigned to basic blocks and partitions are formed at control flow switch and merge points. Although special attention is given to the following control flow structures, our predicate analysis handles any arbitrary control flow graph including irreducible graphs, switch statements and so on.

Critical edges—a critical edge is defined as an edge whose source has more than one successor and whose destination has more than one predecessor. For example, the edge from S2 to S4 in FIG. 1A is a critical edge. At a switch (merge) point, a critical edge prevents the use of the destination (source) node's control predicate as a child predicate in the partition. This occurs because, on this critical edge, the source (destination) node does not dominate (post-dominate) the destination (source) node. To resolve this problem, we conceptually create a node on a critical edge and assign an implicit predicate to the node. Note that this edge splitting is only done at a conceptual level without actually changing the CFG. With this virtual edge splitting, all predecessors dominate their successors at switch points and all successors post-dominate their predecessors dominate their successors at merge points. This simplifies the creation of partitions. Note that if node p dominates or post-dominates node q, p can always be an ancestor of q in the partition graph.

Back edges—Back edges are those edges which complete cycles in a CFG. With current techniques, if we were to take back edges into account in predicate analysis, there is little useful information that we can derive for predicates. For example, for an if-then-else construct enclosed in a loop, the then- and else- clauses will never both be executed in the same iteration, but they may be in different iterations. Therefore, the predicates assigned to the two clauses are disjoint within a particular iteration, but not necessarily across iterations. The results of this predicate analysis are interrupted with back edges ignored. This has little impact on the accuracy of the analysis. This is partially due to the fact that the if-converter is already restricted to acyclic regions.

During partition graph construction, back edges are also split by assigning virtual nodes to them. Our analysis is also applicable to irreducible graphs. However, because the back edges are selected rather arbitrarily for an irreducible graph, the results may be less precise.

Figure 4:
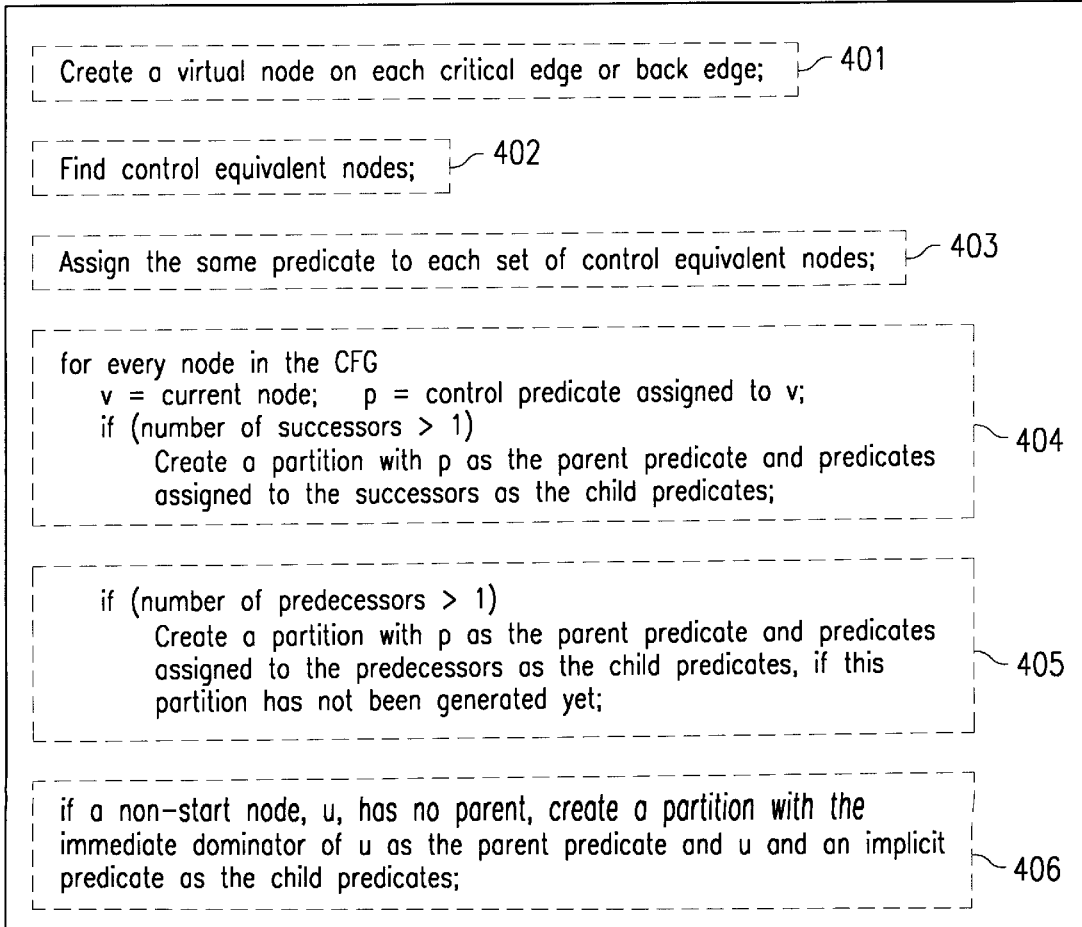
FIG. 4 shows the construction of a partition graph for control predicates.

FIG. 4 presents an algorithm to construct a partition graph based on control predicates. The input is a CFG. Edge splitting is first performed box 401 on critical edges and back edges. Finding control equivalent, box 402, nodes is not essential for correctness, but instead will improve the accuracy of predicate analysis as nodes with equivalent domains are mapped to the same predicate, box 403. We then create partition boxes 404 and 405 at all program switch and merge points to track the predicate relations. Finally, box 406, if any non-start node does not have a parent node, a partition is created to link it to its immediate dominator to make the partition graph complete.

We will now demonstrate how to construct the partition graph of FIG. 3A based on the CFG in FIG. 1A in analogy to our discussion on constructing the same graph based on the if-converted code. Node S1 (FIG 1A) is the start node in the CFG and is given p0 as its control predicate. Node S6 is control equivalent to S1 and is assigned with p0 as well. The control predicates (p2–p5) assigned to the rest of nodes are as shown in FIG. 1A. The a partition (as marked in FIG. 3A) is created due to the switch point at S1. The edge from S2 to S4 is a critical edge, and px is assigned to this edge to achieve edge splitting. The b partition is created due to the switch point at S2. The c and d partitions are created due to the merge points at S4 and S6, respectively.

We will now discuss the details of constructing partition graphs which capture local relations among materialized predicates. The relations among materialized predicates are created at each point where predicates are defined, i.e. compare instructions.

FIG. 5 presents an algorithm to construct a partition graph for materialized predicates. The most common case of defining materialized predicates is a compare instruction, box 501 with an unconditional type. In FIG. 5, a partition is created with pp as the parent predicate and p1 and p2 as the disjoint child predicates. If qp is p0, we can view that the current instruction is guarded by bp which is the control predicate of the basic block, and the union of the domains of p1 and p2 is the domain of bp. Therefore, we build a partition with control predicate bp as the parent predicate. This is the key to establishing the relations between control predicates and materialized predicates and to allow predicate analysis at a global scope. If qp is not p0, all of the control conditions affecting whether this instruction will be executed have been synthesized into the definition qp. This is ensured in our implementation. Therefore, if qp is not p0, the union of p1 and p2 is qp and there is no need to build a partition to link p1 and p2 to bp. One can conclude that the domain of the actual predicate (pp) guarding the compare instruction is always a subset of the domain of bp.

The other three types of compare instructions involve updating a predicate where the previous value of a predicate affects the new predicate result. We treat these compare types conservatively because they appear infrequently and are not easily modeled by the partition graph. For a compare instruction with a conditional type, if qp is p0, this instruction is effectively an unconditional type and is treated in the same way as the unconditional type. If qp is not p0, we simply map p1 and p2 to a null predicate node and during queries to the predicate analysis they are treated in a conservative manner. Note that if both of on and oc (or an and ac) target predicates appear in a compare instruction, we still treat them separately as if there is only one target. For an and type compare instruction, the domain of p1 is always a subset of that of p1_old. For an or type compare instruction, the domain of p1 is always a superset of that of p1_old and a partition is created to link p1 to control predicate bp to make the partition graph complete.

Based on the methods and systems set forth in FIGS. 4 and 5, the partition graph of FIG. 6 is constructed to capture the global relations for predicates in the example (1). The basic block containing the if- clause is assigned with p0 as its control predicate to become the root of the partition graph. The then- and else- clauses are assigned with p_then and p_else as their control predicates, respectively. The initialization of predicates to false does not create any predicate node in the partition graph. The a partition is created at the switch point in the control flow due to the if-then-else construct. The b partition is created due to the compare instruction assigning the materialized predicates, p and q, in the then- clause. The c partition is created due to the compare instruction assigning the materialized predicates, r and s, in the else- clause. This partition graph tracks the global predicate relation that p, q, r, and s are disjoint, which is necessary to assert that x and y do not interfere with each other.

There are two common patterns of compare instructions generated by our if-converter. For a program switch point, a cmpp.un.uc instruction is generated, and the system and method of FIG. 5, box 502, models this precisely. For an unstructured program merge point (often due to a critical edge), a combination of cmpp.un.uc and cmpp.on (or cmpp.oc) instructions is generated. The algorithm in FIG. 5 is always correct but may be conservative for a comparison instruction with an or type. This is because in this initial implementation we did not track the compare conditions controlling predicates nor apply value numbering on predicates. For example, for the if-converted code in FIG. 1B, without value numbering we do not recognize that p3 and p4_1 can be mapped to the same predicate node and are unable to obtain that p4_2 is the union of p4_1 and px. However, this type of unstructured merge only accounts for a small portion (<10% in our experience) of the if-converted compare instructions. In the future, we will model comparison instructions with an or type more precisely.

Although the present invention and its advantages have been described in detail, it should be understood that various changes, substitutions and alterations can be made herein without departing from the spirit and scope of the invention as defined by the appended claims.

What is claimed is:

1. A computer system for processing predicated code having a plurality of predicates, the system comprising:
  means for determining a domain for each predicate;

means for partitioning each determined domain into disjoint subsets; and means for constructing a partition graph from each of the partitioned domains to capture global relations of the predicates, wherein the partition graph is used in data flow analysis of the predicated code during compilation of the predicated code.

2. The system of claim 1, wherein the means for partitioning each predicate comprises:

means for partitioning control predicates.

3. The system of claim 2, wherein the means for partitioning control predicates comprises:

means for creating a virtual node on each critical edge and on each back edge, so as to split the critical and back edges;

means for ascertaining equivalent control nodes;

means for assigning the same predicate to each set of equivalent control nodes; and means for forming partitions in predicates assigned to nodes with merge points and switch points.

4. The system of claim 3, wherein the means for partitioning control predicates further comprises:

means for forming partitions in an immediate dominator to a non-start node that does not have a predecessor node.

5. The system of claim 3, wherein the means for partitioning control predicates further comprises:

means for assigning predicate p0 to a start node as its control predicate.

6. The system of claim 1, wherein the means for partitioning each predicate comprises:

means for partitioning materialized predicates.

7. The system of claim 6, wherein the means for partitioning materialized predicates comprises:

means for forming partitions in predicates assigned to nodes with compare instructions.

8. The system of claim 6, wherein the means for partitioning materialized predicates comprises:

means for forming partitions in predicates assigned to nodes with definitional instructions that define the predicates.

9. The system of claim 1, wherein the predicated code is divided into basic blocks, the system further comprising:

means for determining whether two blocks are disjoint.

10. The system of claim 1, wherein the predicated code is divided into basic blocks, the system further comprising:

means for determining whether one block is a superset of another block.

11. The system of claim 1, wherein the predicated code is divided into basic blocks, the system further comprising:

means for determining whether two blocks are complementary to each other.

12. The system of claim 1, further comprising:

means for performing if-conversion on the control flow graph code to form predicates for each instruction in the graph code.

13. The system of claim 12, wherein:

the means for performing if conversion acts before the means for partitioning each domain.

14. The system of claim 12, wherein:

the means for performing if conversion acts after the means for constructing a partition graph.

15. A system of claim 1, wherein the domain comprises all traces required to completely execute a basic block of predicated code, whereby a trace is a set of instructions that are guarded by a particular predicate P, such that all instructions of the trace are executed when P is true.

16. The system of claim 1, wherein the predicated code is divided into basic blocks, the system further comprising:

means for creating control predicates for the basic blocks.

17. A system of claim 1, wherein the processing of predicate code can be invoked by various phases of compiler optimization without being constrained by an incremental update of any persistent data structures.

18. A computer system for processing code divided into a plurality of basic blocks, the system comprising:

means for determining a domain for each block;

means for partitioning each determined domain into disjoint subsets; and means for constructing a partition graph from each of the partitioned domains to capture global relations of the blocks, wherein the partition graph is used in data flow analysis of the code during compilation of the code.

19. The system of claim 18 further comprising:

means for determining whether two blocks are disjoint.

20. The system of claim 18 further comprising:

means for determining whether one block is a superset of another block.

21. The system of claim 18 further comprising:

means for determining whether two blocks are complementary to each other.

22. A computer implemented method for processing predicated code having a plurality of predicates, the method comprising the steps of:

determining a domain for each predicate;

partitioning each domain of the predicates into disjoint subsets;

constructing a partition graph to capture global relations of the predicates; and utilizing the partition graph in data flow analysis of the predicated code during compilation of the predicated code.

23. The method of claim 22, wherein the step of partitioning each predicate comprises the step of:

partitioning control predicates.

24. The method of claim 23, wherein the step of partitioning control predicates comprises the steps of:

creating a virtual node on each critical edge and on each back edge, so as to split the critical and back edges;

ascertaining equivalent control nodes;

assigning the same predicate to each set of equivalent control nodes; and forming partitions in predicates assigned to nodes with merge points and switch points.

25. The method of claim 24, wherein the step of partitioning control predicates further comprises the step of:

forming partitions in an immediate dominator to a non-start node that does not have a predecessor node.

26. The method of claim 24, wherein the step of partitioning control predicates further comprises the step of:

assigning predicate p0 to a start node as its control predicate.

27. The method of claim 22, wherein the step of partitioning each predicate comprises the step of:

partitioning materialized predicates.

28. The method of claim 27, wherein the step of partitioning materialized predicates comprises the step of:

forming partitions in predicates assigned to nodes with compare instructions.

29. The method of claim 27, wherein the step of partitioning materialized predicates comprises the step of:

forming partitions in predicates assigned to nodes with definitional instructions that define the predicates.

30. The method of claim 22, wherein the predicated code is divided into basic blocks, the method further comprising the step of:

determining whether two blocks are disjoint.

31. The method of claim 22, wherein the predicated code is divided into basic blocks, the method further comprising the step of:

determining whether one block is a superset of another block.

32. The method of claim 22, wherein the predicated code is divided into basic blocks, the method further comprising the step of:

determining whether two blocks are complementary to each other.

33. The method of claim 22, further comprising the step of:

performing if-conversion on the control flow graph code to form predicates for each instruction in the graph code.

34. The method of claim 33, wherein:

the step of performing if conversion is performed before the step of partitioning each domain.

35. The method of claim 33, wherein:

the step of performing if conversion is performed after the step of constructing a partition graph.

36. The method of claim 22, wherein the predicated code is divided into basic blocks, the method further comprising the step of:

creating control predicates for the basic blocks.

37. A computer system for processing predicated code having a plurality of predicates to construct a partition graph that allows for globally analyzing predicate relations, the system comprising:

means for determining a domain for each predicate;

means for partitioning each determined domain into disjoint subsets; and means for constructing the partition graph from each of the partitioned domains to capture global relations of the predicates, wherein the partition graph is used in data flow analysis of the predicated code during compilation of the predicated code.

38. The system of claim 37, wherein the means for partitioning each predicate comprises:

means for partitioning control predicates; and means for partitioning materialized predicates.

39. The system of claim 38, wherein the means for partitioning control predicates comprises:

means for creating a virtual node on each critical edge and on each back edge, so as to split the critical and back edges;

means for ascertaining equivalent control nodes;

means for assigning the same predicate to each set of equivalent control nodes;

means for forming partitions in predicates assigned to nodes with merge points and switch points;

means for forming partitions in an immediate dominator to a non-start node that does not have a predecessor node; and means for assigning predicate p0 to a start node as its control predicate.

40. The system of claim 38, wherein the means for partitioning materialized predicates comprises:

means for forming partitions in predicates assigned to nodes with compare instructions.

* * * * *